United States Patent
Dienst et al.

(10) Patent No.: US 9,907,223 B2
(45) Date of Patent: Mar. 6, 2018

(54) CASTER WHEEL ASSEMBLY FOR AN AGRICULTURAL IMPLEMENT

(71) Applicant: CNH Industrial America LLC, New Holland, PA (US)

(72) Inventors: Johnathon R. Dienst, DeKalb, IL (US); Michael J. Connors, Lockport, IL (US)

(73) Assignee: CNH Industrial America LLC, New Holland, PA (US)

( * ) Notice: Subject to any disclaimer, the term of this patent is extended or adjusted under 35 U.S.C. 154(b) by 67 days.

(21) Appl. No.: 14/797,009

(22) Filed: Jul. 10, 2015

(65) Prior Publication Data
US 2017/0006762 A1    Jan. 12, 2017

(51) Int. Cl.
*A01B 73/06* (2006.01)
*A01C 7/20* (2006.01)
*A01B 63/16* (2006.01)

(52) U.S. Cl.
CPC ............ *A01B 73/065* (2013.01); *A01B 63/16* (2013.01); *A01C 7/208* (2013.01)

(58) Field of Classification Search
CPC ..... A01B 73/06; A01B 73/062; A01B 73/065; A01B 73/067; A01B 73/02; A01B 73/00; A01B 62/22; A01B 63/16; A01C 7/208
See application file for complete search history.

(56) References Cited

U.S. PATENT DOCUMENTS

| | | | |
|---|---|---|---|
| 2,464,227 A * | 3/1949 | Gurries et al. | E02F 3/841 172/507 |
| 2,962,947 A * | 12/1960 | MacDonald | E01C 19/15 172/832 |
| 4,042,045 A * | 8/1977 | Hake | A01B 73/02 172/311 |
| 4,449,725 A | 5/1984 | Robison | |
| 4,450,917 A | 5/1984 | Hake | |
| 4,504,076 A * | 3/1985 | Bedney | A01B 73/065 172/311 |
| 4,506,904 A * | 3/1985 | Kinzenbaw | A01B 73/005 172/248 |

(Continued)

FOREIGN PATENT DOCUMENTS

FR    1309895    11/1962

OTHER PUBLICATIONS

AlbertaFarm Machinery Research Centre Evaluation Report 599, Jun. 1989.

*Primary Examiner* — Jamie L McGowan
(74) *Attorney, Agent, or Firm* — Rebecca L. Henkel; Rickard K. DeMille

(57) ABSTRACT

An agricultural implement system includes a tow bar configured to couple to a hitch assembly. The agricultural implement system also includes a first wing tool bar rotatable relative to the tow bar and disposed proximate to a first side of the tow bar. The first wing tool bar has a first send proximate to the first side of the tow bar and a second end opposite the first end. Further, the agricultural implement system includes a caster wheel assembly having a caster wheel pivotally coupled to a sub-frame. The first sub-frame is pivotally coupled to the first wing tool bar proximate to the second end of the first wing tool bar, and is coupled to the first wing tool bar such that the axis of rotation of the sub-frame extends through the first wing tool bar.

16 Claims, 4 Drawing Sheets

(56) References Cited

U.S. PATENT DOCUMENTS

| | | | |
|---|---|---|---|
| 5,113,956 A * | 5/1992 | Friesen | A01B 73/065 172/311 |
| 5,154,240 A * | 10/1992 | Carrick | A01M 7/0075 172/311 |
| 5,660,237 A | 8/1997 | Boyko et al. | |
| 5,829,370 A * | 11/1998 | Bender | A01B 73/067 111/120 |
| 6,112,827 A | 9/2000 | Reiber et al. | |
| 6,189,465 B1 | 2/2001 | Burns et al. | |
| 6,374,923 B1 | 4/2002 | Friggstad | |
| 6,397,953 B1 | 6/2002 | Ankenman | |
| 7,581,597 B2 * | 9/2009 | Neudorf | A01B 73/067 172/1 |
| 7,743,842 B1 | 6/2010 | Thompson et al. | |
| 7,819,202 B2 * | 10/2010 | Hulicsko | A01B 73/067 172/311 |
| 7,984,767 B2 | 7/2011 | Friggstad et al. | |
| 8,127,861 B2 * | 3/2012 | Meek | A01B 73/065 172/311 |
| 2007/0163791 A1 * | 7/2007 | Meek | A01B 73/065 172/311 |
| 2008/0276846 A1 * | 11/2008 | Friggstad | A01C 5/066 111/52 |
| 2009/0101369 A1 * | 4/2009 | Marggi | A01B 73/067 172/1 |
| 2010/0018729 A1 * | 1/2010 | Hulicsko | A01B 73/067 172/311 |
| 2010/0101811 A1 * | 4/2010 | Friggstad | A01B 73/065 172/1 |
| 2010/0101812 A1 * | 4/2010 | Friggstad | A01B 73/065 172/311 |
| 2010/0101813 A1 * | 4/2010 | Friggstad | A01B 73/065 172/311 |
| 2014/0379230 A1 * | 12/2014 | Koch | A01B 73/065 701/50 |
| 2015/0156947 A1 * | 6/2015 | Sudbrink | A01B 63/22 172/421 |
| 2015/0319912 A1 * | 11/2015 | Stevenson | A01B 73/06 172/669 |

* cited by examiner

CASTER WHEEL ASSEMBLY FOR AN AGRICULTURAL IMPLEMENT

BACKGROUND

The invention relates generally to foldable agricultural implements. Specifically, the embodiments disclosed herein generally relate to caster wheel assemblies for agricultural implements.

Many types of farming implements are used for a variety of tasks, such as tilling, planting, and harvesting. For example, seeders and planters are agricultural implements that include devices that create a trench in soil, deposit seeds into the trench, and fill the trench. A seeding/planting agricultural implement may include a central section or bar coupled to a tow bar and wing assemblies coupled to either side of the tow bar. The wing assemblies typically include tool bars that extend from the tow bar, row units that perform the farming operation and are mounted on the tool bars, and supporting wheel assemblies disposed along the length of the tool bars.

During the farming operation, the row units and wheel assemblies may be configured to "float." That is, the row units and wheel assemblies may be configured such that the row units contact the soil with sufficient force to deposit seeds into the soil at a desired depth while also allowing the wing tool bars to traverse various kinds of terrain. During transport, the wing tool bars may be folded forwardly to reduce the width of the agricultural implement. During turns, the wing tool bars may slightly raise while the wheel assemblies support the end of the wing tool bars. The wheel assemblies may also support each end of the wing tool bars during folding and unfolding.

However, during turns, inside wheel assemblies may pivot upon themselves, which may form undesirable soil divets within the field. The magnitude of the divets within the field may increase during sharp turns. Additionally, during turns, the outside wheel assemblies may travel through rough terrain, such as waterways and drainage ditches, which may increase the amount of wear on the outside wheel assemblies relative to the inside wheel assemblies. Tire scruffing may also occur during folding and unfolding of the wing tool bars. Additionally, as the width of agricultural implements increase to accommodate more rows and larger fields, the increasing number of wheel assemblies used for support may increase the amount of soil compaction for the field, which may negatively affect crop yield. Accordingly, it would be beneficial to improve the structure of wheel assemblies that support the wing tool bars of agricultural implements.

BRIEF DESCRIPTION

In one embodiment, an agricultural implement system includes a tow bar coupled to a hitch assembly; the tow bar has a first side and a second side opposite the first side. The agricultural implement also includes a first wing tool bar rotatable relative to the tow bar and disposed proximate to the first side of the tow bar. The first wing tool bar ahs a first end disposed proximate to the tow bar and a second end opposite the first end. Further, the agricultural implement includes a first caster wheel assembly coupled to the second end of the first wing tool bar opposite the tow bar. The first caster wheel assembly includes a caster wheel pivotally coupled to a sub-frame that is coupled to the wing tool bar proximate to the second end of the first wing tool bar. The sub-frame of the first caster wheel assembly is coupled to the first wing tool bar such that the axis of rotation of the sub-frame extends through the first wing tool bar.

In another embodiment, an agricultural implement system includes a tow bar having a first side and a second side opposite the first side. The agricultural implement system also includes a first wing tool bar rotatable relative to the tow bar, and a second wing tool bar rotatable relative to the tow bar. Both the first and second wing tool bars have a first end and a second end opposite the first end, wherein the first end of the first and second wing tool bars are disposed proximate to the first and second sides of the tow bar, respectively. Further, the agricultural implement includes two caster wheel assemblies having a caster wheel pivotally coupled to a sub-frame that is coupled to the wing tool bar. The sub-frame of the first caster wheel assembly is pivotally coupled to the second end of the first wing tool bar such that the axis of rotation of the sub-frame extends through the first wing tool bar. Similarly, the sub-frame of the second caster wheel assembly is pivotally coupled to the second end of the second wing tool bar such that the axis of rotation of the sub-frame extends through the second wing tool bar. The agricultural implement system is configured to enter a work configuration, in which the first wing tool bar and the second wing tool bar are configured to extend substantially perpendicular to the tow bar and the first caster wheel and the second caster wheel are locked into a working orientation. The agricultural implement is also configured to enter a raised configuration, in which the first and second caster wheels are configured to caster and the first and second wing tool bars are enabled to fold forwardly toward the tow bar. Further, the agricultural implement is configured to enter a transport configuration, in which the first and second wing tool bars are folded toward the front of the tow bar and the first and second casters wheels are locked into a transport orientation.

In a further embodiment, a system includes an agricultural implement system including a tow bar having a first side and a second side opposite the first side. The agricultural implement system also includes a first wing tool bar rotatable relative to the first side of the tow bar and a second wing tool bar rotatable relative to the second side of the tow bar. The first wing tool bar has a first end disposed proximate to the first side of the tow bar and a second end opposite the first end. Similarly, the second wing tool bar has a first end disposed proximate to the second side of the tow bar and a second end opposite the first end. Further, the agricultural implement includes a first caster wheel assembly having a first caster wheel coupled to a first sub-frame and a second caster wheel assembly having a second caster wheel coupled to a second sub-frame. The first sub-frame is pivotally coupled to the second end of the first wing tool bar and the second sub-frame is pivotally coupled to the second end of the second wing tool bar. The first sub-frame is coupled to the first wing tool bar such that the axis of rotation of the first sub-frame extends through the first wing tool bar and the second sub-frame is coupled to the second wing tool bar such that the axis of rotation of the second sub-frame extends through the second wing tool bar. The agricultural implement system also includes a locking mechanism coupled to the tow bar and configured to lock and unlock pivotal movement of the first and second sub-frames. The control system is operatively coupled to the locking mechanism and configured to lock the pivotal movement of the first and second sub-frames while the agricultural implement enters a work configuration, unlock the pivotal movement of the first and second caster wheels sub-frames while the agricultural implement enters a raised configuration, and lock the pivotal movement of the first and second subframes while the agricultural implement enters a transport configuration.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Wing wheel assemblies are generally employed on agricultural implements to support the implement during various modes of operation (e.g., while turning at a headland, while operating in a planting mode, etc.). However, during turns, the inside wheels of wing wheel assemblies pivot upon themselves, which may for undesirable divets within the field. The outside wheels of the wing wheel assemblies may also traverse rough terrain at high speeds, accelerating the wear on the outside wheels and the wheel assembly frames. These effects may also be enhanced during short turns or turns that involve traversing over an earlier planted row.

To address these structural concerns, the agricultural implement of certain embodiments disclosed herein may use a caster wheel assembly instead of a non-pivoting wing wheel assembly. In particular, the agricultural implement may include a caster wheel assembly disposed at the end of each wing of a tool bar assembly. The caster wheel assembly may be coupled to each wing such that the axis of rotation of the caster wheel assembly is extends through the center of the wing. The caster wheel may be locked into a desired orientation during a farming operation and/or during transport, and unlocked (e.g., free to caster) during folding and unfolding as well as during turns (e.g., at headlands). The agricultural implement may also include a control system and locking mechanism configured to control the locking and unlocking of the caster wheels. In certain embodiments, the control system may be configured to automatically lock and unlock the caster wheels as the implement transitions between different modes of operation.

In certain embodiments, a single caster wheel assembly is coupled to each wing tool bar. Utilizing a single caster wheel assembly at the end of each wing may reduce the soil compaction caused by the agricultural implement. Further, employing caster wheels may reduce the divet formation during turns, as compared to non-rotating wheel assemblies. Utilizing caster wheel assemblies may also minimize the tire scruff that may otherwise occur during folding and unfolding of the wings.

Figure 1:
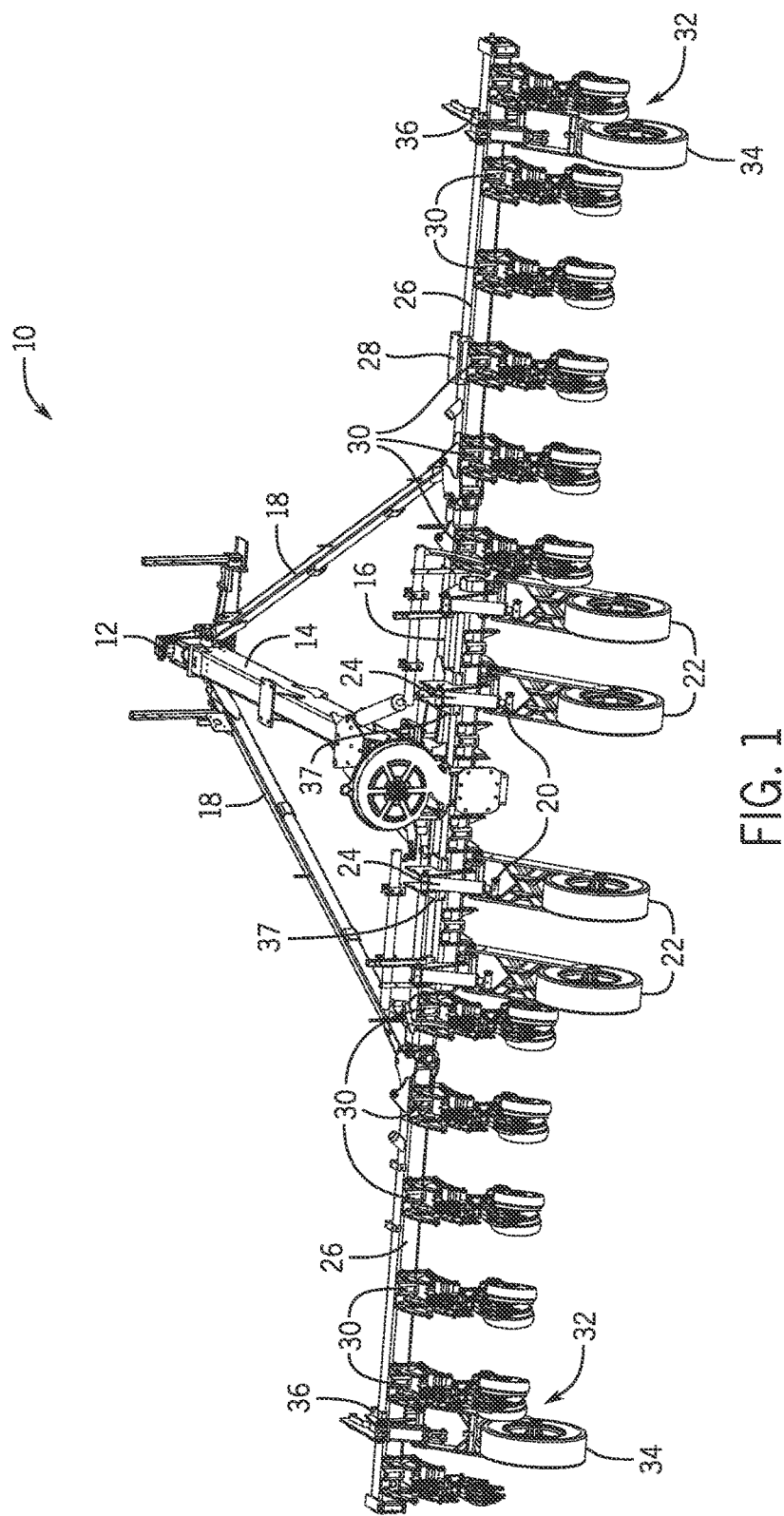
FIG. 1 is a perspective view of an agricultural implement having a caster wheel disposed on an end of each wing of the implement, in accordance with an embodiment of the present approach.

With the foregoing in mind, FIG. 1 is a perspective view of an agricultural implement 10 in the form of a planter. The agricultural implement 10 may be coupled to a work vehicle, such as a tractor, and may be configured to be towed behind the work vehicle. Although the embodiments described below are described in relation to a planter, it should be appreciated that the present embodiments may be applied to other types of wide agricultural implements.

As shown in FIG. 1, the planter 10 includes a hitch assembly 12 configured to couple the planter 10 to a work vehicle. A tow bar 14 is pivotally coupled to the hitch assembly 12, which may include a three-point hitch. The pivotal coupling between the hitch assembly 12 and the tow bar 14 enables the planter 10, as a whole, to adjust its trajectory while simultaneously maintaining stability. A central tool bar 16 is coupled to the tow bar 14 such that the central tool bar extends transversely with respect to the tow bar 14. As shown in FIG. 1, the central tool bar 16 may be located behind the wing tool bars, which are discussed in further detail below. However, in other embodiments, the central tool bar 16 may be located in front of the wing tool bars or even between the wing tool bars. Additionally, draft tubes 18 may extend from the tow bar 14 to wing tool bars, which are described in detail below. The draft tubes 18 may provide support for the wing tool bars.

The planter 10 also includes two central wheel assemblies 20 having tires 22 and located below the central tool bar 16. As depicted in FIG. 1, the central wheel assemblies 20 are coupled to the central tool bar 16. Alternately or additionally, the central wheel assemblies 20 may be coupled to the tow bar 14. Each of the central wheel assemblies 20 also includes an actuator 24, such as a hydraulic cylinder system, that is configured to move the various components of the central wheel assemblies 20 into a transport configuration, a raised configuration, and a work configuration, which are described in further detail below. For example, the actuators of the central wheel assemblies 20 may transition the central wheel assemblies 20 into a retracted position when the planter 10 is in a work (i.e., ground engaging) configuration. The number of tires 22 within each central wheel assembly 20 may vary based on the width of the wings of the planter 10, the length of the central tool bar 16, various weight distribution mechanisms of the planter 10, and other factors. As shown, FIG. 1 depicts two central wheel assemblies 20 that includes two tires 22.

A wing tool bar 26 is coupled to either side of the tow bar 14, as depicted in FIG. 1. In other embodiments, the wing tool bars 26 may also be coupled to the central tool bar 16 and/or the draft tubes 18. As noted above, the draft tubes 18 may provide additional stability for the wing tool bars 26. The wing tool bars 26 may generally be parallel to the central tool bar 16 and substantially perpendicular (e.g., 65° to 150°) to the tow bar 14. As illustrated, each wing tool bar 26 is coupled to a respective draft tube 18. In certain configurations of the planter 10 (e.g., in the raised and transport configurations), the wing tool bars 26 may fold forwardly (i.e., toward the front of the tow bar 14) while the tow bar 14 and the central tool bar 16 extend backwards, as will be described in further detail below. Although the planter 10 is described as a front-folding planter, it should be appreciated that the agricultural implement 10 may be any suitable implement, such as pivot transport, stack fold, and rear fold implements.

In the illustrated embodiment, wing tool bar actuators 28 are coupled to the wing tool bars 26 to provide down force on the wing tool bars 26. Similarly to the actuators 24, the wing tool bar actuators 28 may be hydraulic cylinders; in other embodiments, the wing tool bar actuators 28 may be a motorized pulley system. In certain embodiments, the wing tool bar actuators 28 may also act as a weight management system that transfers weight from the center of the planter (e.g., the tow bar 14) to the wing tool bars 26 to keep the row units, which are discussed below, engaged with the ground during the planting operations.

Multiple row units 30 that perform the farming operations are coupled to both of the wing tool bars 26. For example, as shown in FIG. 1, six row units 30 are disposed along the length of each wing tool bar 26, although the number of row units 30 may vary based on the desired functionality of the agricultural implement 10 as well as the length of the wing tool bars 26. Each row unit 30 may perform a variety of functions depending on the design of the row unit 30, the nature of the field (e.g., tilled or untilled), and other factors. For example, in the depicted embodiment of the planter 10, the row units 30 may be configured to dispense seeds along parallel rows at a desired spacing. Accordingly, each row unit 30 may include an opening disc to create a trench in the soil, a metering system to provide a desired amount of material (e.g., seed) for deposition into the trench, a closing disc to cover the trench with the displaced soil, and a firming wheel to pack the displaced soil in place, thereby reducing the possibility of the material from becoming dislodged from the soil. In certain embodiments, the row units 30 may also include a fertilizer dispenser to fertilize the row. Each row unit 30 may receive the material via a recipient system or hopper mounted on the framework of the respective wing tool bar 26, which in turn may be coupled to a larger distribution system coupled to the tow bar 14 and the central tool bar 16. The distribution system may be configured to move the material from repositories (e.g., seeds from seed tanks coupled to the planter 10) to the row units 30.

Each wing tool bar 26 includes a single caster wheel assembly 32 coupled to a distal end of the wing tool bar 26. In alternative embodiments, multiple caster wheel assemblies 32 may be coupled to each wing tool bar 26. Both of the caster wheel assemblies 32 include a caster wheel 34 mounted to a sub-frame 36, which is pivotally coupled to the wing tool bar 26. As shown in FIG. 1, the caster wheel assembly 32 is located at the distal end of each wing tool bar 26, remote from the tow bar 14 and not between two row units 30. Additionally, the sub-frame 36 is coupled to the wing tool bar 26 such that the axis of rotation of the sub-frame 36 and, subsequently, the caster wheel 34, extends through the center of the wing tool bar 26, rather than slightly behind the center of the wing tool bar 26. The caster wheel assemblies 32 are also coupled to a locking mechanism 37 that, when actuated, blocks pivotal movement of the sub-frame 36 to lock the caster wheel 34 in a desired orientation (i.e., based on the present configuration of the planter 10).

As noted above, the planter 10 may enter one of several configurations depending on the present operation of the planter 10. In particular, the planter 10 may enter a work configuration, a raised configuration, and a transport configuration, for example, although there may be other possible configurations of the planter 10. FIG. 1 depicts the planter 10 in a position similar to the work configuration, although the wing tool bars 26 have been raised such that the row units 30 do not engage the ground. In the work configuration, the wing tool bars 26 are substantially parallel to the central tool bar 16 and substantially perpendicular to the tow bar 14, such the row units 30 may engage the ground during the farming operation (e.g., seeding). During the farming operation, the caster wheels 34 may be locked in a desired orientation (e.g., parallel to the direction of travel) by blocking rotation of the sub-frames 36, such that the wheels do not interfere with the operation of the row units 30, and may essentially act as fixed-orientation tires.

Figure 2:
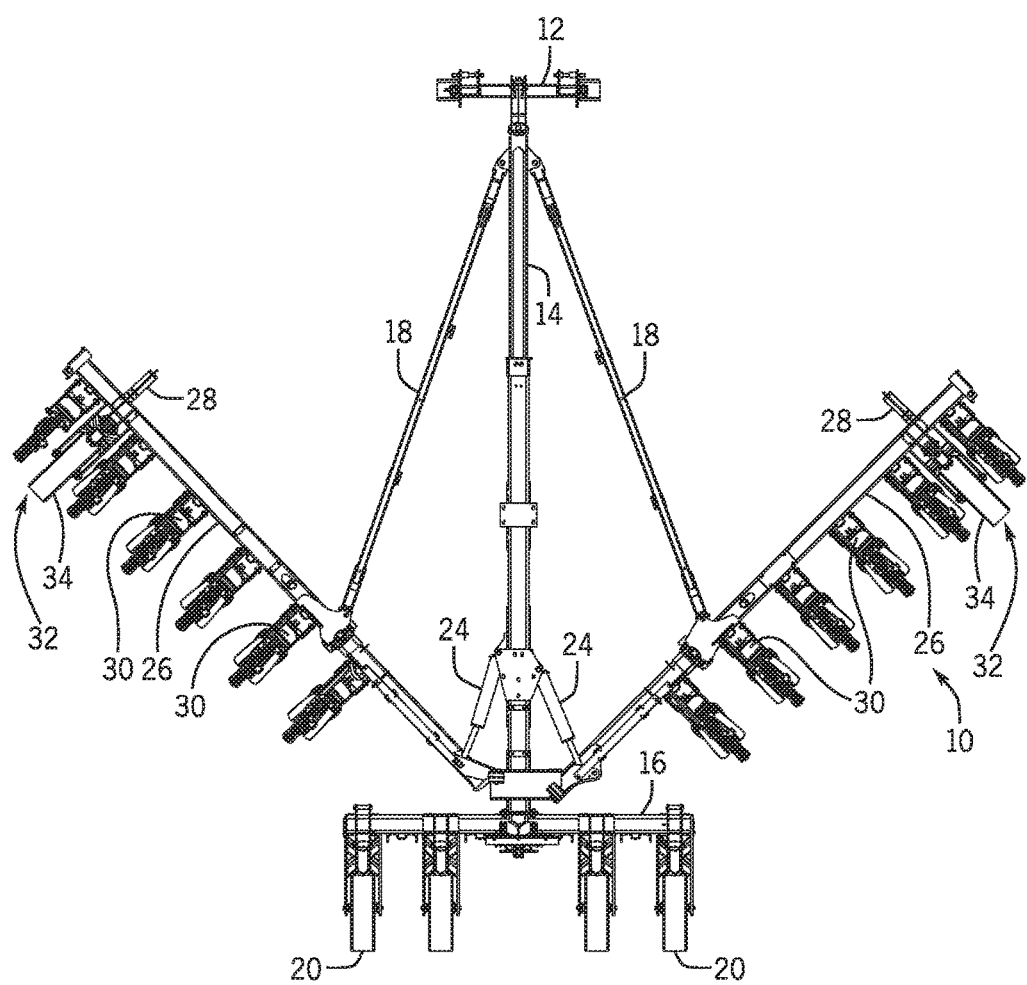
FIG. 2 is a top view of the agricultural implement of FIG. 1 in a partially folding configuration, in accordance with an embodiment of the present approach.

The planter 10 may be configured to enter the raised configuration when turning in the field (e.g., at a headland) and/or transitioning to or from the transport configuration. In the raised configuration, the wing tool bars 26 may be raised such that the row units 30 disengage the ground, as shown in FIG. 2. As noted above, the actuators 24 may be used to control the configuration of the wing tool bars 26. In the raised configuration, the caster wheels 34 are unlocked, thereby enabling pivotal movement of the sub-frames 36 so that the caster wheels 34 can caster. By allowing the caster wheels 34 to caster, the caster wheels 34 may find equilibrium during a turn and more easily follow the path of motion of the wing tool bars 26. In particular, the caster wheels 34 may naturally follow an arc to maintain equilibrium as the wing tool bars 26 rotate. Allowing the caster wheels 34 to follow a natural arc may result in less wear on the caster wheels 34, as compared to fixed-orientation tires. Further, allowing the caster wheels 34 to caster and follow a natural arc may reduce the divot formation within the field. Accordingly, the operator of the planter 10 may execute sharper turns, as well as turns that traverse previously planted rows.

Figure 3:
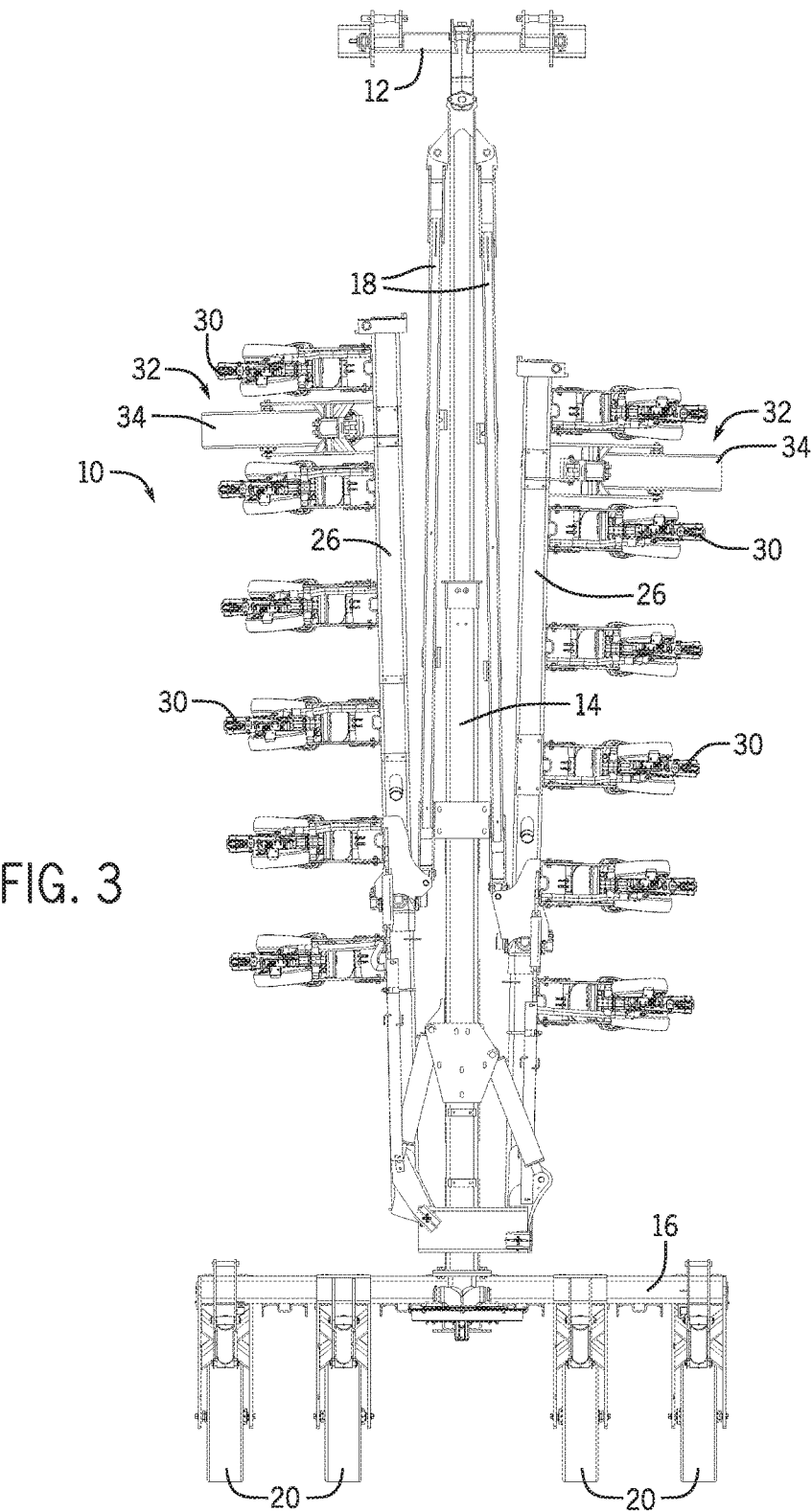
FIG. 3 is a top view of the agricultural implement of FIG. 1 in a transport configuration, in accordance with an embodiment of the present approach.

FIG. 3 is a top view of the planter 10 in the transport configuration, in which the wing tool bars 26 are fully folded. As the implement 10 transitions to the transport configuration, the tow bar 14 and the central tool bar 16 move backwardly while the wing tool bars 26 fold in a forward direction and inward toward the tow bar 14. With the implement in the transport configuration, the caster wheels 34 may be locked in a desired orientation, and, in certain embodiments, the caster wheel assemblies 32 may be retracted to enable the wing tool bars 26 to be supported by the tow bar 14 and/or the hitch assembly 12, thereby relieving the load on the actuators of the central tool bar 16. Further, in certain embodiments, the caster wheel assemblies 32 may be interleaved with one another and/or other components of the wing tool bars 26 to reduce the width of the planter 10 when in the transport configuration.

Figure 4:
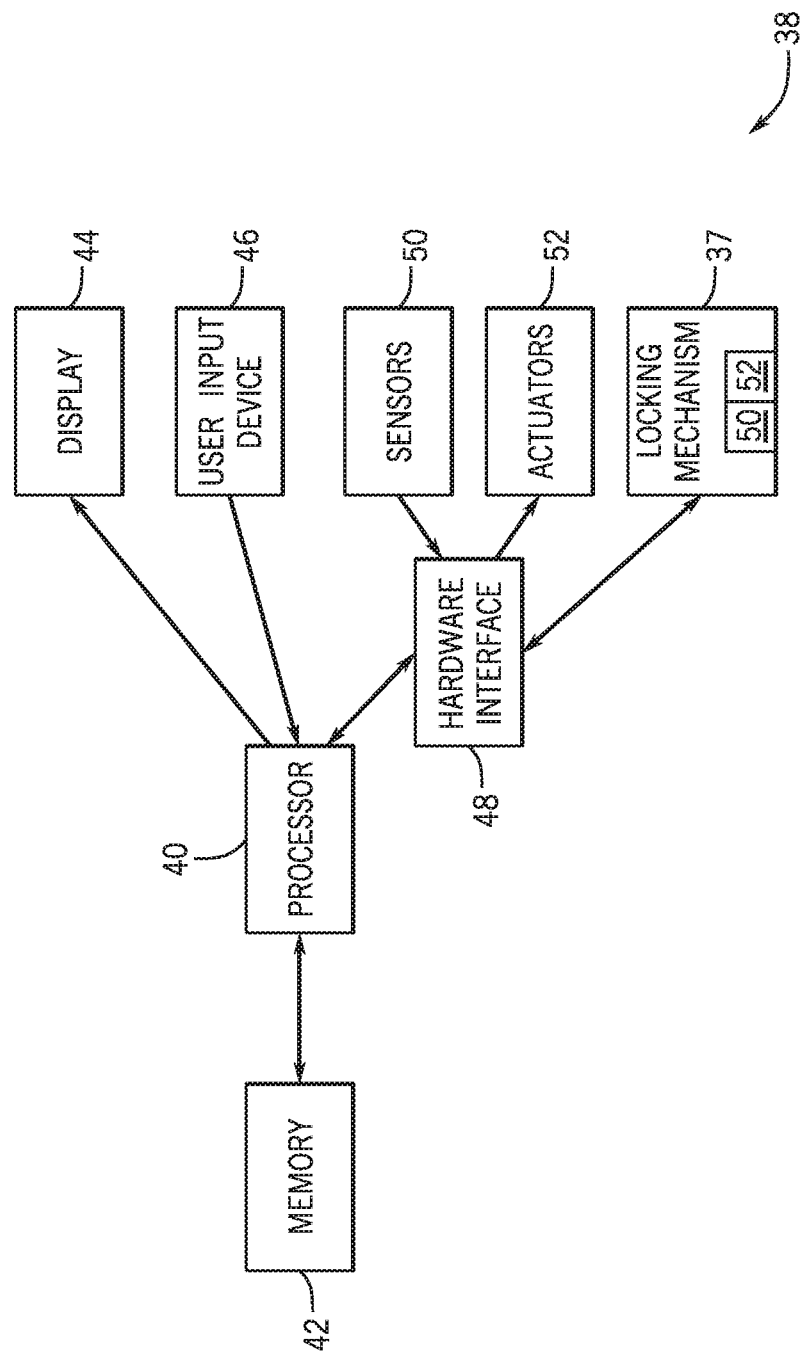
FIG. 4 is a block diagram of a control system configured to control the agricultural implement of FIG. 1, in accordance with an embodiment of the present approach.

A control system 38 associated with the planter 10 may be configured to control, among other things, the locking and unlocking of the caster wheels 34. Portions of the control system 38 may reside in the work vehicle attached to the planter 10, while other components may be located on the planter 10. The control system 38 may generally include a processor 40, memory 42, a display 44, a user input device 46, and a hardware interface 48 used by the processor 40 to communicate with various sensors 50 and actuators 52, as shown in FIG. 4. As depicted, the processor 40 and/or other data processing circuitry may be operably coupled to the memory 42 to retrieve and execute instructions for managing the work vehicle and/or the planter 10. For example, these instructions may be encoded in programs that are stored in the memory 42, which may be an example of a tangible, non-transitory computer-readable medium, and may be accessed and executed by the processor 40 to facilitate performance of certain presently disclosed techniques. The memory 42 may be a mass storage device, a FLASH memory device, removable memory, or any other non-transitory computer-readable medium. Additionally and/or alternatively, the instructions may be stored in an additional suitable article of manufacture that includes at least one tangible, non-transitory computer-readable medium that at least collectively stores these instructions or routines in a manner similar to the memory 42 as described above. The control system 38 may also include the display 44 for a user to view various data regarding the work vehicle 10 and/or the planter 10 and a user input device 46 (e.g., a keyboard, mouse, touchscreen, gesture input device, etc.) to enable the user to interact with the control system 38.

The control system 38 may also communicate with various sensors 50 and actuators 52 via the hardware interface 48. For example, the control system 38 may monitor the current state of the work vehicle and/or the planter 10 using various sensors such as position sensors, pressure sensors, temperature sensors, clearance sensors (e.g., distance between stationary and rotary components), fluid flow sensors, load sensors, and the like. The control system 38 may alter the state of the components of the work vehicle and/or the planter 10 by using actuators; the actuators may include valves, pumps, positioners, inlet guide vanes, switches, and so on, useful in performing control actions. For example, the control system 38 may control the position and/or configuration of the wing tool bars 26 using the actuators 24 and/or the wing tool bar actuators 28.

As noted above, the control system 38 may be configured to control the locking and unlocking of the caster wheels 34. In particular, the control system 38 may use sensors 50, such position sensors and pressure sensors, to determine the current configuration of the caster wheels 34 (e.g., locked or unlocked). The control system 38 may then actuate a locking mechanism 37 coupled to the caster wheel assemblies 32 to either lock or unlock the caster wheels 34. For example, the locking mechanism 37 for a caster wheel 34 may include a pin (e.g., controlled by a solenoid or hydraulic cylinder) that blocks rotation of the sub-frame 36 (i.e., castering) about the pivot axis created between the caster wheel assembly 32 and the wing tool bar 26, thereby blocking castering of the wheels 34. The control system 38 may determine whether the caster wheels 34 are unlocked based on the position of the pins as determined by sensors. The control system 38 may then change the position of the pin using, for instance, a solenoid or hydraulic cylinder coupled to the pin in order to lock or unlock the caster wheel 34. The control system 38 may lock or unlock the caster wheels 34 based on inputs received from the operator via the user input device 46. In certain embodiments, the control system 38 may automatically lock and unlock the caster wheels 34 at the appropriate time intervals once the folding and/or unfolding process (i.e., transitioning to or from the transport configuration) has begun.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An agricultural implement system, comprising:
   a tow bar configured to couple to a hitch assembly, the tow bar having a first side and a second side, opposite the first side;
   a first wing tool bar rotatable relative to the tow bar, the first wing tool bar having a first end disposed proximate to the first side of the tow bar and a second end, opposite the first end; and
   a first caster wheel assembly comprising a first caster wheel coupled to a first sub-frame, the first sub-frame pivotally coupled to the first wing tool bar proximate to the second end of the first wing tool bar;
   wherein the first sub-frame of the first caster wheel assembly is coupled to the first wing tool bar such that an axis of rotation of the first sub-frame extends through the first wing tool bar;
   wherein the agricultural implement system is configured to enter;
      a work configuration, in which the first wing tool bar extends substantially perpendicular to the tow bar, and the first sub-frame is locked into a working orientation;
      a raised configuration, in which the first caster wheel is configured to caster, and first wing tool bar is enabled to fold forwardly toward the tow bar; and
      a transport configuration, in which the first wing tool bar is folded toward the front of the tow bar and the first caster wheel is locked into a transport orientation;
      wherein the first sub-frame is secured to the hitch assembly, the tow bar, or any combination thereof, while the agricultural implement system is in the transport configuration.

2. The agricultural implement system of claim 1, comprising a control system configured to control an orientation of the first caster sub-frame.

3. The agricultural implement system of claim 2, wherein the first wing tool bar is configured to fold forwardly relative to the tow bar, and the control system is configured to automatically adjust the orientation of the first sub-frame as the first wing tool bar folds forwardly.

4. The agricultural implement system of claim 1, wherein the agricultural implement system comprises a planter.

5. The agricultural implement system of claim 1, comprising at least one hydraulic cylinder coupled to the first wing tool bar and configured to control a position of the first wing tool bar.

6. The agricultural implement system of claim 1, comprising a central tool bar coupled to and extending transversely from the tow bar, the central tool bar having a first end and a second end, opposite the first end, wherein the first wing tool bar is disposed proximate to the first end of the central tool bar.

7. The agricultural implement system of claim 1, comprising:
   a second wing tool bar rotatable relative to the tow bar, the second wing tool bar having a first end disposed proximate to the second side of the tow bar and a second end opposite the first end; and
   a second caster wheel assembly comprising a second caster wheel coupled to a second sub-frame, the second sub-frame pivotally coupled to the second end of the second wing tool bar;
   wherein the second sub-frame of the second caster wheel assembly is coupled to the second end of the second wing tool bar such that an axis of rotation of the second sub-frame extends through the center of the second end of the second wing tool bar.

8. An agricultural implement system, comprising:
   a tow bar having a first side and a second side, opposite the first side;
   a first wing tool bar rotatable relative to the tow bar, the first wing tool bar having a first end disposed proximate to the first side of the tow bar and a second end, opposite the first end;
   a second wing tool bar rotatable relative to the tow bar, the second wing tool bar having a first end disposed proximate to the second side of the tow bar and a second end, opposite the first end;
   a first caster wheel assembly comprising a first caster wheel coupled to a first sub-frame, the first sub-frame is pivotally coupled to the first wing tool bar proximate to the second end of the first wing tool bar such that an axis of rotation of the first sub-frame extends through the first wing tool bar; and a second caster wheel assembly comprising a second caster wheel coupled to a second sub-frame, the second sub-frame is pivotally coupled to the second wing tool bar proximate to the second end of the second wing tool bar such that an axis of rotation of the second sub-frame extends through the second wing tool bar;

wherein the agricultural implement is configured to enter a work configuration, in which the first and second wing tool bars extend substantially perpendicular to the tow bar and the first and second caster wheels are locked into a working orientation;

wherein the agricultural implement is configured to enter a raised configuration, in which the first and second caster wheels are configured to caster and the first and second wing tool bars are enabled to fold forwardly toward the tow bar; and wherein the agricultural implement is configured to enter a transport configuration, in which the first and second wing tool bars are folded toward the front of the tow bar and the first and second caster wheels are locked into a transport orientation.

9. The agricultural implement system of claim 8, comprising a control system configured to control the transition of the agricultural implement system between the work, raised, and transport configurations.

10. The agricultural implement system of claim 8, wherein the first and second wing tool bars are configured to fold forwardly relative to the tow bar, and a control system is configured to automatically adjust the orientation of the first and second sub-frames as the first and second wing tool bars fold forwardly.

11. The agricultural implement system of claim 8, wherein a first wing tool bar actuator is coupled to the first wing tool bar, and a second wing tool bar actuator is coupled to the second wing tool bar.

12. The agricultural implement system of claim 8, wherein the agricultural implement comprises a planter.

13. An agricultural implement comprising:
a tow bar having a first side and a second side, opposite the first side;
a first wing tool bar rotatable relative to the tow bar, the first wing tool bar having a first end disposed proximate to the first side of the tow bar and a second end, opposite the first end;
a second wing tool bar rotatable relative to the tow bar, the second wing tool bar having a first end disposed proximate to the second side of the tow bar and a second end, opposite the first end;
a first caster wheel assembly comprising a first caster wheel coupled to a first sub-frame, the first sub-frame is pivotally coupled to the first wing tool bar proximate to the second end of the first wing tool bar such that an axis of rotation of the first sub-frame extends through the first wing tool bar;
a second caster wheel assembly comprising a second caster wheel coupled to a second sub-frame, the second sub-frame is pivotally coupled to the second wing tool bar proximate to the second end of the second wing tool bar such that an axis of rotation of the second sub-frame extends through the second wing tool bar; and
a locking mechanism coupled to the tow bar and configured to selectively lock and unlock pivotal movement of the first and second sub-frames; and
a control system operatively coupled to the locking mechanism and configured to:
lock the pivotal movement of the first and second sub-frames while the agricultural implement enters a work configuration;
unlock the pivotal movement of the first and second sub-frames while the agricultural implement enters a raised configuration; and
lock the pivotal movement of the first and second sub-frames while the agricultural implement enters a transport configuration.

14. The agricultural implement system of claim 13, wherein the locking mechanism comprises a pin coupled to at least one of a solenoid or a hydraulic cylinder, and wherein the pin is configured to block rotation of the first and second sub-frames about the axis of rotation.

15. The agricultural implement system of claim 13, comprising a central tool bar coupled to and extending transversely from the tow bar, the central tool bar having a first end and a second end, opposite the first end, wherein the first wing tool bar is disposed proximate to the first end of the central tool bar and the second wing tool bar is disposed proximate to the second end of the central tool bar.

16. The system of claim 13, wherein the agricultural implement is a planter.

* * * * *